(12) United States Patent
Fortier et al.

(10) Patent No.: US 8,983,911 B2
(45) Date of Patent: Mar. 17, 2015

(54) STORAGE MEDIA ABSTRACTION FOR UNIFORM DATA STORAGE

(75) Inventors: Dominique Fortier, Issaquah, WA (US); Steven Maillet, Redmond, WA (US); Jered Aasheim, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 13/163,730

(22) Filed: Jun. 20, 2011

(65) Prior Publication Data
US 2012/0323977 A1  Dec. 20, 2012

(51) Int. Cl.
*G06F 17/30* (2006.01)

(52) U.S. Cl.
CPC .................. *G06F 17/30091* (2013.01)
USPC ........................................... 707/661

(58) Field of Classification Search
CPC ................ G06F 17/30091; G06F 17/30241
USPC ................. 707/661, 665, 694, 882
See application file for complete search history.

(56) References Cited

U.S. PATENT DOCUMENTS

| | | | |
|---|---|---|---|
| 6,732,104 B1 | 5/2004 | Weber | |
| 7,779,428 B2 | 8/2010 | Umbehocker et al. | |
| 7,810,106 B2 | 10/2010 | Kapadia et al. | |
| 2004/0193740 A1* | 9/2004 | Kasmirsky et al. | ................ 710/1 |
| 2006/0036645 A1* | 2/2006 | Dao et al. | ................... 707/104.1 |
| 2008/0250198 A1 | 10/2008 | Purchase et al. | |
| 2009/0016190 A1* | 1/2009 | Jakob | ........................ 369/109.01 |
| 2010/0332456 A1* | 12/2010 | Prahlad et al. | ................ 707/664 |

OTHER PUBLICATIONS

Perelmutov, et al., "Storage Resource Manager", Retrieved at <<http://cdsweb.cern.ch/record/865804/files/p1230.pdf>>, Retrieved Date: Mar. 25, 2011, pp. 1230-1233.
"Data Grid Overview", Retrieved at <<https://www.irods.org/index.php/Data_Grid_Overview>>, Retrieved Date: Mar. 25, 2011, pp. 6.
"Making Data Access Easier", Retrieved at <<http://msdn.microsoft.com/en-us/library/Aa277525.aspx>>, Retrieved Date: Mar. 25, 2011, pp. 4.

* cited by examiner

*Primary Examiner* — Thu-Nguyet Le
(74) *Attorney, Agent, or Firm* — Nicholas Chen; Kate Drakos; Micky Minhas

(57) ABSTRACT

A storage abstraction system is described herein that exposes storage from an operating system as a uniform storage device and abstracts from applications the selection of a particular storage location and different properties of storage devices. The application provides the data to store and some information about the application's goals for storing the data, and lets the operating system route the data to the right place based on the data's characteristics. The operating system may choose to store data anywhere from L2 cache to a cloud-based storage service and anything in between, based on information about the data's persistence requirements, expected usage, access frequency, security needs, and so forth. The system lets applications and users focus on expressing their goals and needs for the data, and lets the operating system manage the hardware.

18 Claims, 3 Drawing Sheets

STORAGE MEDIA ABSTRACTION FOR UNIFORM DATA STORAGE

BACKGROUND

A variety of devices exists in computer systems for storing data. Desktops, servers, laptops, and other computing devices may include one or more hard drives for storing large amounts of data. Hard drives may be configured for a variety of data access purposes. For example, a server may use a redundant array of inexpensive disks (RAID) configuration, a storage area network (SAN), or other technologies that improve storage characteristics such as latency, fault tolerance, security, capacity, access time, and so on. Laptops and mobile devices may include flash memory, and many computer systems use flash-based memory today in the form of solid-state disks (SSDs). Computing systems also have access to remote storage, such as cloud-based storage services from multiple vendors, online backup solutions, remote datacenters provided within an organization, and so forth.

Software applications can select from any of these devices when storing data. An application may generate documents, configuration information, or other output that the application stores by invoking one or more operating system storage application-programming interfaces (APIs). These APIs typically involve the application explicitly identifying a storage device on which to store data. For example, the operating system may assign a letter or device path to each available storage device that the application specifies along with a folder path within the drive at which to store output data produced by the application. Users, too, become involved in managing data storage, and often memorize where their documents are stored so that the user can inform the application or another application where to find stored data items on the computer system. A user may download a document or other data item with one application, telling the application where to store the item, and then open the item with another application, telling that application where to find the item. Thus, users and applications are heavily involved in data management today.

Often the user (or administrator) is the only one that knows the configuration of the computer system and the particular storage characteristics and benefits of each storage device. For example, the user may know that a storage device identified by drive letter C is an SSD, drive D is a RAID array, drive E is a SAN, and drive F is an optical disk. The user may use his knowledge of each drive's properties to decide where to store data when using an application. For example, if the user wants a fast access time for the data, he may choose to store it on the SSD. If the user wants to archive the data and does not expect to access it frequently, he may burn the data to an optical disk using the optical drive. If the user selects poorly, then the data may be more difficult or slower to access. As data characteristics change, such as a file becoming less frequently accessed by the user, it is up to the user to manually manage the data to delete it, move it to a different storage device, and so forth. Operating systems provide programs and third parties provide a significant number of utilities just for managing data stored by applications. Data management is often a difficult and time-consuming task.

SUMMARY

A storage abstraction system is described herein that exposes storage from an operating system as a uniform storage device and abstracts from applications the selection of a particular storage location and different properties of storage devices. The application provides the data to store and some information about the application's goals for storing the data, and lets the operating system route the data to the right place based on the data's characteristics. The operating system may choose to store data anywhere from L2 cache to a cloud-based storage service and anything in between, based on information about the data's persistence requirements, expected usage, access frequency, security needs, and so forth. The system lets applications and users focus on expressing their goals and needs for data, and expects the operating system manage the hardware so the application and user can refocus on using the data rather than becoming buried in the minutia of managing how it is stored.

In some embodiments, the storage abstraction system provides an API exposed to applications that abstracts the storage media away from the storage action. When writing data, the operating system receives the contextual information, determines available storage devices, and automatically selects a location at which to store the data. The operating system provides a reference to the application for requesting the data in the future, which may remain valid even if the data is subsequently moved to a new location. The operating system may maintain an index of where data is stored so that references to data can be resolved to data storage locations. The operating system may monitor data over time and determine additional data characteristics. As data characteristics change, the operating system may select a new location to which to transfer data, where the application can still access the data using the provided references. Thus, the storage abstraction system relieves applications and users from managing data placement and automatically manages stored data to select the most appropriate storage medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
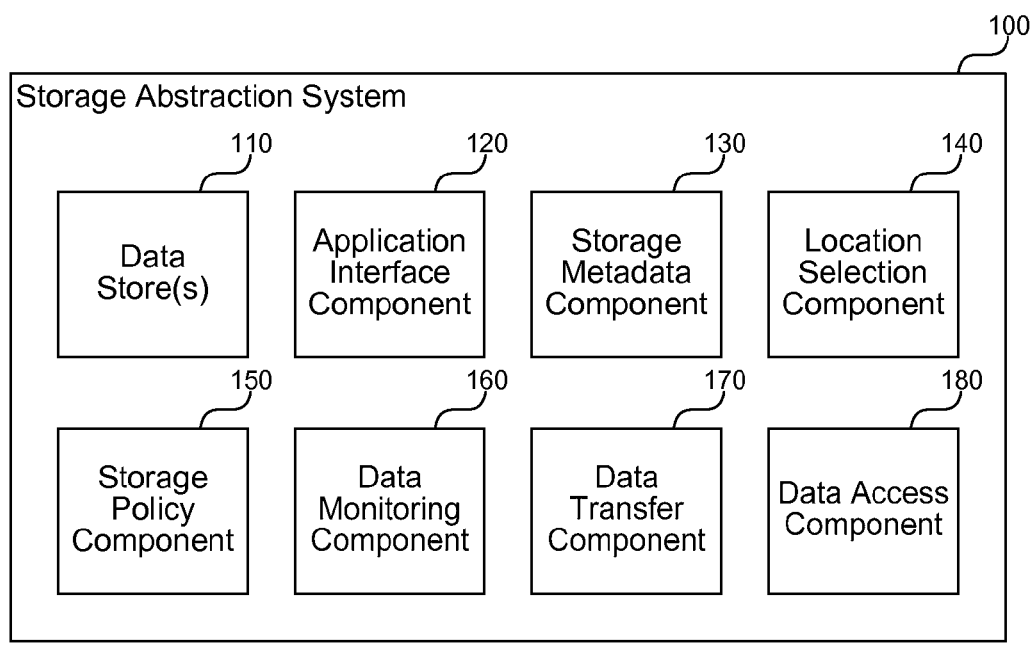
FIG. 1 is a block diagram that illustrates components of the storage abstraction system, in one embodiment.

A storage abstraction system is described herein that exposes storage from an operating system as a uniform storage device and abstracts from applications the selection of a particular storage location and different properties of storage devices. In other words, the storage abstraction system separates the application's storage actions from the decision of where to store data. The application provides the data to store and some information about the application's goals for storing the data, and lets the operating system route the data to the right place based on the data's characteristics. The operating system may choose to store data anywhere from L2 cache to a cloud-based storage service and anything in between, based on information about the data's persistence requirements, expected usage, access frequency, security needs, and so forth. Unlike storage today, which is very device centric and relies heavily on application and user knowledge, the storage abstraction system lets applications and users focus on expressing their goals and needs for data, and expects the operating system manage the hardware like it was originally designed to do. The application and user can refocus on using the rather than becoming buried in the minutia of managing how it is stored.

In some embodiments, the storage abstraction system provides an API exposed to applications that abstracts the storage media away from the storage action. For example, the API may provide applications Write and Read functions, where the Write function specifies contextual information about the data without specifying a data location, and the Read function specifies an opaque reference to the data that does not identify a specific location. When writing data, the operating system receives the contextual information, determines available storage devices, and automatically selects a location at which to store the data. The operating system provides a reference to the application for requesting the data in the future, which may remain valid even if the data is subsequently moved to a new location. The operating system may maintain an index of where data is stored so that references to data can be resolved to data storage locations. The operating system may monitor data over time and determine additional data characteristics. As data characteristics change, the operating system may select a new location to which to transfer data, where the application can still access the data using the provided references.

In some embodiments, the storage abstraction system receives a set of policies configured by an administrator or other user that provides instructions for characterizing data. The application itself and the user may also provide instructions for characterizing the data. The policy determines which contextual information wins when there is a conflict, and the system uses the policy to select an appropriate storage location for received data. The system stores the data for later use (potentially with the data itself), and begins monitoring the data usage patterns. Monitoring allows the system to detect changes in data characteristics that may suggest a different storage location for the data. The system may perform periodic batch processing to relocate data that is more suitably stored at a different location. For example, the system may migrate data from a flash-based disk drive to a traditional hard drive, from a hard drive to a cloud-based storage service, or between any other storage locations. In some cases, the system may keep multiple copies of data and determine which copy to use to satisfy any particular application request. At any given time, the system matches characteristics of the available storage such as latency, security, availability, reliability, retention capability, and size, with the purpose of any given data item to determine suitable storage media for storing the data. Thus, the storage abstraction system relieves applications and users from managing data placement and automatically manages stored data to select the most appropriate storage medium.

FIG. 1 is a block diagram that illustrates components of the storage abstraction system, in one embodiment. The system 100 includes one or more data stores 110, an application interface component 120, a storage metadata component 130, a location selection component 140, a storage policy component 150, a data-monitoring component 160, a data transfer component 170, and a data access component 180. Each of these components is described in further detail herein.

The one or more data stores 110 store data received from one or more applications and managed by the system. The data stores may include one or more volatile memories, files, file systems, hard drives, flash-based memory devices, storage area networks, databases, cloud-based storage services, or other facilities for persisting application data over time. The system 100 determines the data stores 110 available for storing data and selects an appropriate data store for any given data item automatically on behalf of an application or user. The system 100 selects a data store based on one or more policies or goals for efficiently managing data without burdening the application or user with that task.

The application interface component 120 provides an interface to one or more applications for storing and accessing data used by the application. The interface may include one or more APIs, user interfaces, or other channels for communicating information to and from the system 100. The application interface component 120 receives from an application requests to store and access data and invokes other components of the system 100 to complete the requests. For example, upon receiving a reference from an application to access a previously stored data item, the application interface component 120 may invoke the data access component 180 to locate and retrieve the requested data.

The storage metadata component 130 receives information from an application and automatically determines characteristics of data that the application requests to be stored. The characteristics may include information describing how frequently the application will access the data, priority of the data, recoverability of the data, security expectations of the data, legal compliance requirements for the data, and so forth. The data characteristics affect where the data can be stored and from which data store the data can be most efficiently accessed. For example, health or business information that cannot be exported under local laws may not be suitable for storage in a cloud that includes servers in a foreign country. Frequently accessed data may be most suitable for storage in a local, low latency device, while lower priority or less frequently accessed data may be able to be efficiently stored remotely or in a higher latency storage medium.

The location selection component 140 automatically selects a storage medium on which and a location therein at which to store received application data based on the determined data characteristics. The component 140 may enumerate and manage a list of available storage devices, and may apply one or more policies or heuristics to select an appropriate storage medium for a particular data item, based on the data items characteristics, goals of the system, needs of an operating system, and so forth. For example, if a storage medium is getting full or becoming heavily fragmented, the component 140 may select a different storage medium for storing new data. As another example, the system may factor in latency, security, or other considerations to select a medium that will provide the user with an expected level of service for the data. For example, a user would not expect long delays to access a document that the user frequently accesses, but may accept a longer delay to access rarely used data. This can allow the component 140 to select between remote and local storage as well as low latency and high latency storage. The system 100 may also consider bandwidth costs of migrating data. For example, small files may be placed farther away than large files because the bandwidth used to retrieve them is less than a large file and therefore incurs lower cost.

The storage policy component 150 receives one or more policies that affect the location and medium selected for storing received data. An administrator may determine one or more policies for an organization that coincide with internal policies of the organization, legal compliance under which the organization operates, or other restrictions related to where data is stored. The system 100 may provide a user interface through which the administrator or other users can configure preferences for how data is stored. The system 100 may receive different policies for different types of data, based on file types, the application that creates the data, where the data is created, a user that creates the data, or any other criteria presented by the system 100.

The data-monitoring component 160 monitors stored data over time to determine whether data characteristics change and whether the automatically selected storage location remains an appropriate location for storing each data item. For example, if once frequently accessed data is not accessed for a threshold period, then the component 160 may determine that the data can be moved to higher latency, cheaper cost storage or even be deleted. Conversely, if data is accessed more frequently than originally expected, the system may make the data more readily available by moving the data to a low latency, local storage device or even keeping the data in memory or L2 cache. The data-monitoring component 160 may provide feedback or generate a report to the user so that the user can manage and monitor how the system 100 is making decisions related to the user's data.

The data transfer component 170 moves data originally stored at a first location to a second location determined by the data-monitoring component 160. The data transfer component 170 may move data due to changed characteristics of the data, evolving needs of a computing device on which the system 100 operates (e.g., a disk getting full or request to transfer data to a new computing device), bandwidth cost, or other factors that affect the efficient placement of data. The data transfer component 170 may move data to the new location and lazily remove data from the old location to allow applications to continue to access the data at both locations or to more efficiently utilize resources of the computing device. Those of ordinary skill in the art will recognize numerous existing technologies for efficient handling of data replication and movement that can be used in conjunction with the system 100 described herein.

The data access component 180 provides access to applications to one or more data items regardless of a storage location of the items that was previously automatically selected by the system 100. The component 180 receives a reference to the data from the application (e.g., a globally unique identifier (GUID)) and consults an index or other data structure managed by the system 100 to determine where the data is presently stored. The component 180 then accesses the data at the identified location and provides the data to the application. The application can remain unaware of where the data is stored and can avoid the burden of complex data management associated with computing systems today.

The computing device on which the storage abstraction system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
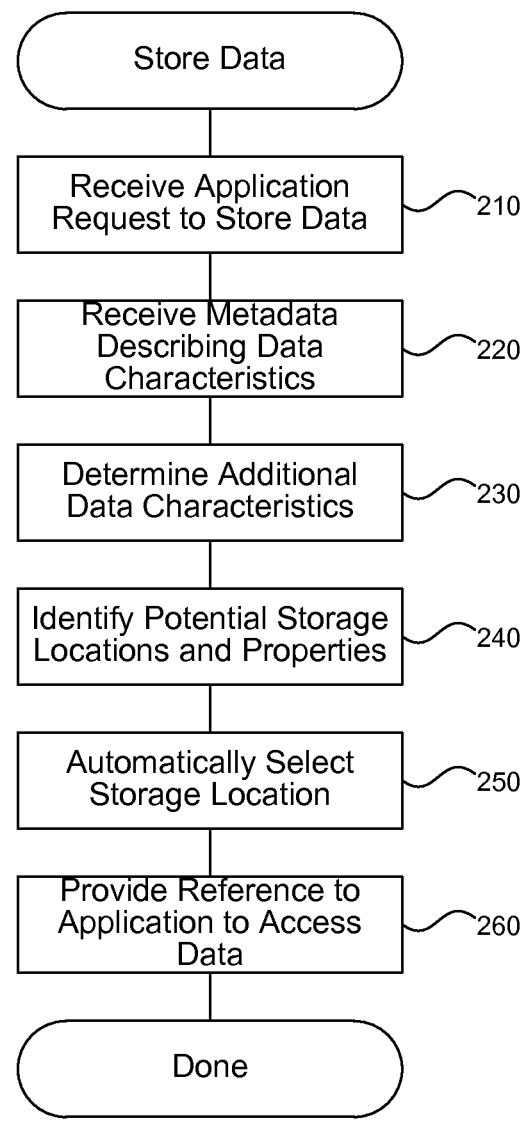
FIG. 2 is a flow diagram that illustrates processing of the storage abstraction system to store application data at an automatically selected location, in one embodiment.

FIG. 2 is a flow diagram that illustrates processing of the storage abstraction system to store application data at an automatically selected location, in one embodiment.

Beginning in block 210, the system receives an application request to store data generated by the application. The request may include a pointer to one or more bytes of data, a data size, and one or more characteristics of the data. The characteristics may identify an expected frequency of access of the data, how long the data will be needed (e.g., temporary file versus permanent storage), whether the data is private or security sensitive, any legal compliance restrictions associated with the data, and so on. The system may receive the characteristics as one or more flags or other parameters to a storage API provided by an operating system to the application.

Continuing in block 220, the system receives metadata that describes characteristics of the data useful for determining where to store the data. As noted previously, the system may receive the metadata with the request to store the data, or may receive separate information describing the data. In some embodiments, the system provides a backwards compatibility layer that allows existing applications to call traditional file system APIs while another application or component provides metadata describing data the application stores.

Continuing in block 230, the system automatically determines one or more data characteristics in addition to the data characteristics received from the application. For example, the system may note the application that provided the data, when the data was received, how large the data is, information accessible from a knowledge base describing typical behavior of the application, and so forth. The system uses the received and determined data characteristics to create a complete picture of how the application will use the stored data so that the system can select an appropriate location for the data from among multiple available storage devices.

Continuing in block 240, the system identifies one or more potential storage locations and properties of the identified locations at which the system can store the application data. The system may invoke one or more operating system functions for enumerating storage devices attached to the computing system on which the system is running as well as receiving information describing external storage locations, such as cloud-based data stores, remote databases, file shares, and so on. Even when there is only a single storage device (e.g., a hard drive), the system still benefits the application by unburdening the application from needing to understand the number of storage devices. In the case of multiple storage devices, the system relieves the application (and user) from complicated file management and selects where to store data on the application's behalf. The system can also leverage information known about multiple applications to manage data more efficiently for the whole system than any single application would have the information to do.

Continuing in block 250, the system automatically selects one of the potential storage locations based on the data characteristics and storage location properties. The system matches data characteristics and application expectations with storage location properties. For example, if an application requests frequent access to a data item and a particular storage location provides fast, low-latency access to stored items, then the system may decide to store the data item at that storage location. The system may also consider other properties not known to the application, such as available capacity of the storage device, power consumed by the storage device, and so on. The system either does not receive a storage location from the application or may ignore a location provided by the application to select a location based on criteria chosen by the system.

Continuing in block 260, the system provides a reference to the application in response to the storage request through which the application can access the data regardless of the data's location. The reference may include a GUID, hash key, or other reference that the system can use to determine which data item the application is requesting and to determine where the system is currently storing the underlying data items. The system may include an index or other data structure for cataloging where data items are stored and matching each stored data item to a reference given to the application for retrieving the data item. After block 260, these steps conclude.

Figure 3:
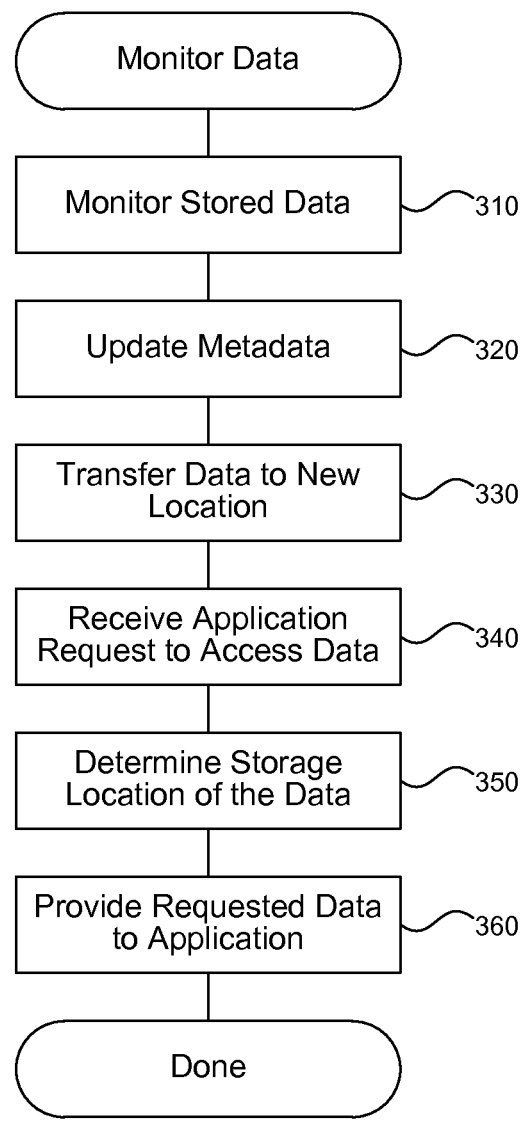
FIG. 3 is a flow diagram that illustrates processing of the storage abstraction system to monitor stored application data for changed data characteristics, in one embodiment.

FIG. 3 is a flow diagram that illustrates processing of the storage abstraction system to monitor stored application data for changed data characteristics, in one embodiment.

Beginning in block 310, the system monitors a stored data item to identify one or more data access characteristics that indicate how the data item is used. For example, the system may observe frequency of access of the data, time of day that the data is accessed, whether the data is ever updated after it is first written (e.g., write-once, read-many (WORM) data), and so forth.

Continuing in block 320, the system updates stored metadata describing the stored data item based on the identified data access characteristics. The system may track metadata for each item stored by the system or for items that leverage automatic storage location selection provided by the system. The metadata aggregates information known by the system describing how each data item is used so that the system can factor the aggregate information into decisions related to managing the data.

Continuing in block 330, the system transfers the data to a new location without informing an application that originally stored the data. The system separates application knowledge of data that was stored from system knowledge of where data is stored, so that the application can focus on the application's context of the data and is removed from managing how and where data is stored. The system manages how and where data is stored on behalf of multiple applications and can manage data according to a global or cross-application policy based on information technology (IT) policies or other goals.

Continuing in block 340, the system receives an application request to access the transferred data, wherein the application provides a reference to identify the data but this reference does not include information indicating where the data is stored. The system looks up the data's location using the received reference and location information managed by the system.

Continuing in block 350, the system determines the storage location of the data based on the received reference. The storage location may include a particular storage medium, storage device, and location within the storage device. For example, the location may indicate a folder on a hard drive, a data reference for a cloud-based storage service, or other storage location information. The system may include a local, remote, or distributed index with which the system maps storage locations to data items so that data items can be found upon request regardless of their location and without the application knowing where the system previously placed or subsequently transferred the data.

Continuing in block 360, the system accesses the requested data at the determined location and provides the requested data to the application. The system may retrieve the data using file system APIs, a web service API for cloud storage, or using other paradigms for accessing data. Regardless of where the data is stored or any unique properties of the location where the data is stored, the storage abstraction system presents a uniform interface for accessing data to the application, so the application is unburdened from knowing about and managing differing device characteristics and access methods. After block 360, these steps conclude.

In some embodiments, the storage abstraction system provides a storage device of unlimited size to an application. Because applications today select a storage device explicitly, the application can no longer store data to the device when the device gets full. However, the system does not present any one storage device to the application but rather provides a storage service that is available to the application to store potentially unlimited amounts of data. As an application stores data, the system may place some data on one storage device and other data on other storage devices, so that as the application's needs for storage space grow, the system can find and provide more and more storage to the application. Ultimately, the system can extend storage over to a cloud or other external storage so that the application does not run out of space. The system can also handle peak or unusual but time sensitive application requests for extra storage by identifying available external storage and providing the identified storage to the application until the application returns to a normal level of storage needs.

From the foregoing, it will be appreciated that specific embodiments of the storage abstraction system have been described herein for purposes of illustration, but that various modifications may be made without deviating from the spirit and scope of the invention. Accordingly, the invention is not limited except as by the appended claims.

We claim:

1. A computer-implemented method to store application data at an automatically selected location, the method comprising:
   receiving an application request to store data generated by the application;
   receiving metadata describing characteristics of the data useful for determining where to store the data;
   automatically determining one or more data characteristics in addition to the data characteristics received from the application, wherein automatically determining further comprises identifying the application that provided the data;
   identifying one or more potential storage locations and properties of the identified locations at which the system can store the application data wherein identifying further comprises identifying information related to at least one other application's use of data storage locations to efficiently manage data storage locations across multiple applications;
   automatically selecting one of the potential storage locations based on the data characteristics and storage location properties; and providing a reference to the application in response to the storage request through which the application can access the data regardless of the data's location,
wherein the preceding steps are performed by at least one processor.

2. The method of claim 1 wherein receiving the application request comprises receiving one or more bytes of data, a data size, and one or more characteristics of the data.

3. The method of claim 1 wherein receiving the application request comprises receiving information identifying an expected frequency of access of the data by the application.

4. The method of claim 1 wherein receiving the application request comprises receiving information identifying how long the data will be needed by the application.

5. The method of claim 1 wherein receiving the application request comprises receiving information identifying whether the data is private, security sensitive, or has legal compliance restrictions associated with the data.

6. The method of claim 1 herein receiving metadata comprises receiving metadata separately from the storage request to allow backwards compatibility with existing applications that call traditional file system APIs to store data.

7. The method of claim 1 wherein identifying potential storage locations comprises invoking one or more operating system functions for enumerating storage devices attached to a computing system.

8. The method of claim 1 wherein identifying potential storage locations comprises receiving information describing one or more external storage locations, including at least one cloud-based data storage service.

9. The method of claim 1 wherein selecting a storage location comprises matching data characteristics with storage location properties to determine a storage location for storing the requested data.

10. The method of claim 1 wherein selecting a storage location comprises considering other properties not known to the application related to each storage location.

11. The method of claim 1 wherein providing the reference to the application comprises creating a reference that the system can use to determine which data item the application is looking for and to determine where the system is currently storing the requested data item.

12. The method of claim 1 wherein providing the reference to the application comprises providing a reference related to an index of data items.

13. A computer system for storage media abstraction to provide uniform data storage, the system comprising:
a processor and memory configured to execute software instructions embodied within the following components;
one or more data stores that store data received from one or more applications and managed by the system;
an application interface component that provides an interface to one or more applications for storing and accessing data used by each application;
a storage metadata component that receives information from an application and automatically determines characteristics of data that the application requests to be stored wherein the data characteristics identifies the application that provided the data;
a location selection component that automatically selects a storage medium on which to store received application data and a location therein at which to store the received application data based on the determined data characteristics;
a storage policy component that receives one or more policies that affect the location and medium selected for storing received data;
a data-monitoring component that monitors stored data over time to determine whether data characteristics change and whether the automatically selected storage location remains an appropriate location for storing each data item and identifies information related to at least one other application's use of data storage locations on the storage media to manage the appropriate locations across multiple applications;
a data transfer component that moves data originally stored at a first location to a second location determined by the data-monitoring component, and delays removing only data originally stored at the first location from the first location; and
a data access component that provides access to applications to one or more data items regardless of a storage location of the items that was previously automatically selected by the system.

14. The system of claim 13 wherein the one or more data stores include at least one internal data store attached to the computer system and at least one external data store with which the computer system remotely communicates using a network.

15. The system of claim 13 wherein the application interface component exposes an application-programming interface (API) through which the system receives from an application requests to store and access data, wherein the requests do not identify a location at which the data is stored.

16. The system of claim 13 wherein the location selection component enumerates and manages a list of available storage devices, and applies one or more policies or heuristics to select an appropriate storage medium for a particular data item.

17. A computer-readable storage device comprising instructions for controlling a computer system to monitor stored application data for changed data characteristics, wherein the instructions, upon execution, cause a processor to perform actions comprising:
monitoring a stored data item to identify one or more data access characteristics that indicate how the data item is used by an application wherein the one or more data access characteristics identify the application that provided the data;
updating stored metadata describing the stored data item based on the identified data access characteristics;
transferring the data item to a new location without informing an application that originally stored the data, wherein the new location is a location determined by identifying information related to at least one other application's use of data storage location ;
removing the data item from only a previous location after a period of time has passed since the data item was transferred to the new location;
receiving an application request to access the transferred data, wherein the application provides a reference to identify the data that does not include information indicating where the data is stored;
determining a storage location of the data based on the received reference; and
accessing the requested data at the determined location and providing the requested data to the application.

18. The device of claim 17 wherein determining the storage location comprises accessing an index of data items and storage locations to determine a location of the item.

* * * * *